Patented Apr. 15, 1947

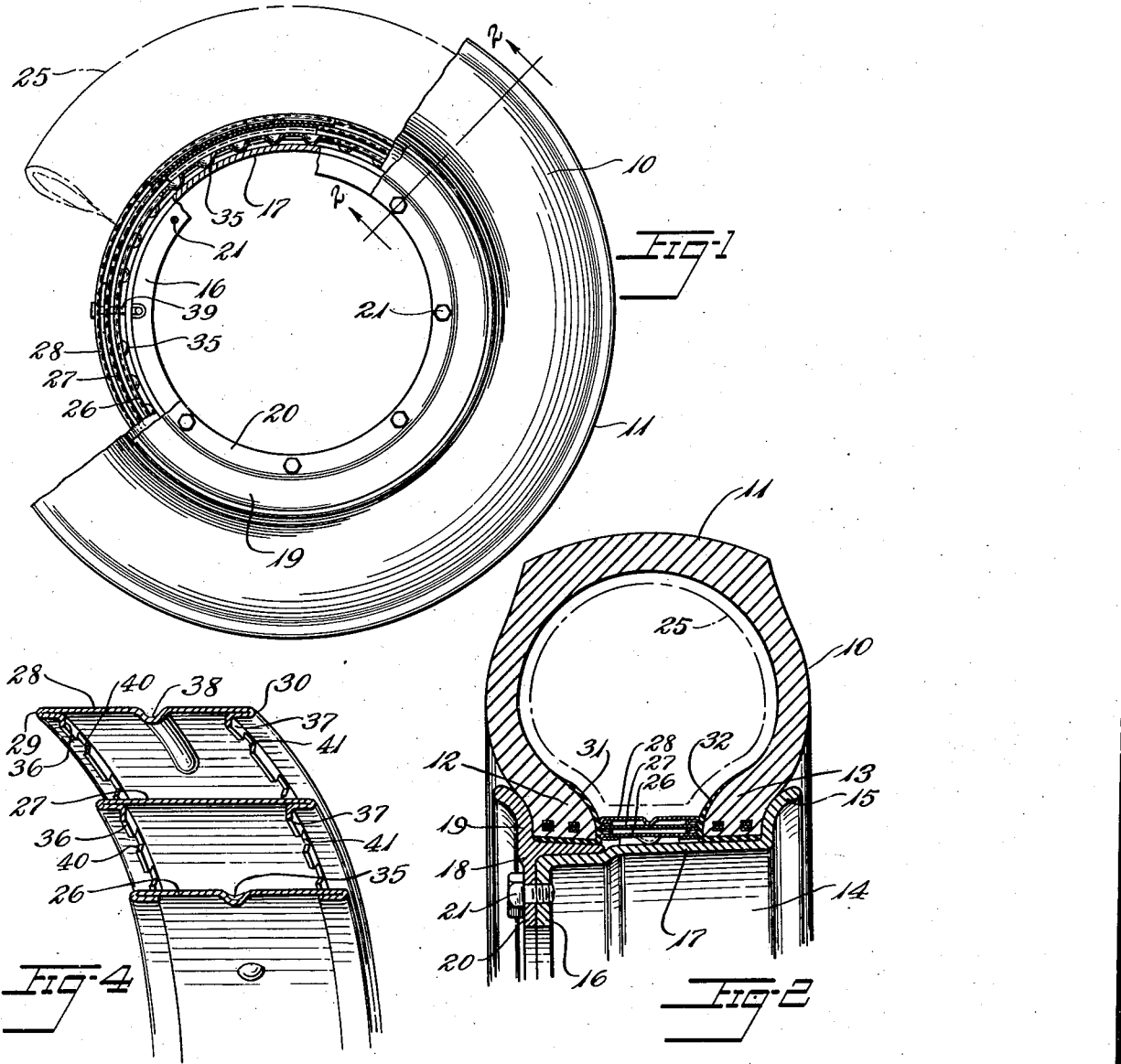

2,419,075

UNITED STATES PATENT OFFICE 2,419,075

TIRE BEAD LOCK

Frank Herzegh, Shaker Heights, Ohio, assignor to The B. F. Goodrich Company, New York, N. Y., a corporation of New York Application August 17, 1943, Serial No. 498,946

3 Claims. (Cl. 152—400)

This invention relates to locking structure for securing the bead portions of a tire in place on a wheel rim, and the invention is especially useful where an airtight seal between the bead portions of the tire is desired.

The principal objects of the invention are to provide effectively for locking of the tire to the rim structure, to provide this while effecting an airtight seal of the tire to the locking structure, to provide airtight sealing of the tire without employment of an inner tube, to provide lateral rigidity with circumferential flexibility in the bead locking structure, to provide lateral accommodation to the shape of the bead portions of the tire, to provide effective spacing of the bead locking bands from each other and from the rim seat, to facilitate construction by progressive rolling of the bands, to provide for convenience of manufacture and assembly, and to provide for safety of operation.

These and other objects will appear from the following description and the accompanying drawings.

Of the drawings:

Fig. 1 is a side elevation of a rim structure, a tire, and a bead lock made in accordance with and embodying the invention, in assembled relation, parts being broken away to show the construction.

Fig. 2 is a cross sectional view thereof taken on line 2—2 of Fig. 1.

Fig. 3 is a perspective view of a portion of the bead lock structure.

Fig. 4 is a perspective view of the bead lock structure as seen from the inside, parts being broken away for clarity of illustration.

Referring to the drawings, the numeral 10 designates a pneumatic tire casing having a tread portion 11 for contacting with the ground, and inextensible bead portions 12, 13 for securing it to a rim. The rim is of the circumferentially split type comprising a rim portion 14 having an outwardly extending tire engaging flange 15 at one side, and an inwardly extending flange 16 at the other side, the cylindrical portion 17 therebetween providing a seat for one of the bead portions 13 of the tire.

The other rim portion 18 is adapted to telescope over a reduced shoulder of the rim and provide a seat for the opposite bead portion 12 of the tire. It has an outwardly extending flange 19 for clamping against the bead portion of the tire and an inwardly extending flange 20. Screws 21 pass through clearance openings in the flange 20 and engage threaded openings in the flange 16 whereby the rim portions may be drawn together.

An inner tube 25 may be employed and is indicated in dot and dash lines. This however is not necessary in view of the sealing of the tire cavity by the bead lock.

The bead lock is seated on the rim between the bead portions of the tire and comprises concentric sealing bands 26, 27, 28, preferably endless and of metal, seated one above the other and capable of lateral self-adjusting movement with respect to each other. Each band is formed at its margins with thin rounded non-cutting sealing edges, such as 29, 30 for engaging the inner walls of the tire casing which preferably are faced at the bead portions with resilient facings 31, 32 of rubber or other rubber-like material to provide a good sealing surface. The margins are preferably formed by folding the sheet metal of the band closely upon itself to provide thin, rounded edges.

For spacing the innermost band from the rim, a series of projections 35 are formed along a median zone of the band 26 on its lower face preferably by bumping out the sheet metal of which the band is formed. These projections being spaced circumferentially from each other do not interfere materially with circumferential flexing of the band to enter between the bead portions of the tire, and by their location midway of the bead portions do not interfere with sealing of the band while providing support from the rim at a midposition even where the surface of the rim is tapered, as shown.

For spacing the remaining bands 27, 28 from the band 26 without unduly stiffening them, and to permit construction of the bands by a continuous rolling process from strip metal, the margins of each band are folded under inwardly closely against the band and are then formed as radially inwardly extending flanges 36, 37 which contact the underlying band. Additional support may be provided at the mid-portion of the band 28 by a rib 38 formed from the sheet metal to resist internal pressure in the tire by support from the underlying band. This also provides additional lateral stiffness to the band. The rib may be made discontinuous for greater circumferential flexibility and may be eliminated at the position of the valve 39 as shown in Fig. 3. This valve, where the casing is used without an inner tube, is passed through aligned openings in all the bands and sealing washers of rubber or other resilient rubber-like material are compressed between the bands around it as by tightening a nut upon the threaded stem of the valve. While the bands are locked thereby to each other at the valve position, freedom of lateral movement with respect to each other is provided at all other positions of the circumference of the bead lock to accommodate variations in internal shape of the tire.

In use the rim screws 21 are drawn up to compress the bead lock between the bead portions of the tire and the bands adjust themselves to the shape of the bead portions. The rounded margins of the bands seal against the sealing faces of the tire providing a labyrinth multiple seal which holds air effectively without the use of an inner tube. The spacing means hereinabove described assures location of each band in the proper position at the bead portions of the tire for most effective sealing by pressure of the edges of the bands directly against the bead portions of the tire, without interference of one band with another at the individual zones of sealing, and while permitting self-adjustment of each band for most effective engagement with the tire, especially in the lateral direction. Loss of air pressure across the total ring is thus greatly reduced or eliminated not only by the individual seals but also by the steps in the drop of air pressure through the labyrinth as compared to the total pressure drop, the rate of loss for air seepage through a stage being dependent upon the degree of the pressure drop. When the tire is removed from the rim, the bead lock may be sprung to oval form and removed therefrom due to flexibility and independence of the bands.

For greater flexibility, the flanges 36, 37 may be notched at intervals as at 40, 41, if desired. Whether so notched or not, these flanges serve for spacing the bands as hereinabove described, without interfering with the sealing function of the edges which are also formed by bending the margins of the sheet metal.

Variations may be made without departing from the scope of the invention as it is defined by the following claims.

I claim:

1. A locking ring for the bead portions of a pneumatic tire casing, said ring comprising a plurality of radially superimposed laterally stiff bands circumferentially relatively flexible independently of one another, each band being folded closely upon itself at its margins providing thin rounded edges for exerting pressure against the bead portions of the tire, at least one of said bands having radially inwardly directed flanges formed integrally therewith at its margins adapted to space it from an adajcent band, said flanges extending in the circumferential direction and having notched portions to provide circumferential flexibility.

2. A locking and sealing ring for the bead portions of a pneumatic tire casing, said ring comprising a plurality of radially superimposed laterally stiff bands circumferentially relatively flexible independently of one another arranged in nested relation to seal against said bead portions each band being folded closely upon itself at its margins providing thin rounded sealing edges for exerting pressure against the bead portions of the tire, at least one of said bands having inwardly directed flanges formed integrally therewith at its margins adapted to space it from an adjacent band, said flanges extending in the circumferential direction and being notched to increase circumferential flexibility, and tire inflating means connecting said bands to each other at one position while permitting the lateral independent movement at other positions.

3. The combination of a pneumatic tire casing having bead portions, and a locking and sealing ring for sealing the space between said bead portions, said locking and sealing ring being circumferentially continuous and comprising a laterally stiff and circumferentially flexible band of sheet metal folded inwardly closely upon itself at its margins to provide thin rounded bead-engaging edges for exerting sealing pressure against the bead portions of the casing, and axially spaced-apart flanges extending radially inward from the band for spacing it radially outward of an adjacent supporting surface, said flanges having a radial extent presenting said edges at said bead portions and said flanges constituting continuations of the folded metal and being interrupted at circumferential positions to promote circumferential flexibility of the ring.

FRANK HERZEGH.

REFERENCES CITED

The following references are of record in the file of this patent:

UNITED STATES PATENTS

| Number | Name | Date |
| --- | --- | --- |
| 1,038,144 | Hutchinson | Sept. 10, 1912 |
| 466,577 | Schrader | Jan. 5, 1892 |
| 1,122,875 | Doty | Dec. 29, 1914 |
| 1,343,685 | Runyan | June 15, 1920 |

FOREIGN PATENTS

| Number | Country | Date |
| --- | --- | --- |
| 9,076 | British | 1893 |
| 22,728 | British | 1902 |
| 101,795 | British | 1917 |
| 683,826 | French | 1930 |